Jan. 21, 1964     L. L. SHRIVER     3,118,245
BAIT POSITIONING FISHING DEVICE
Filed Sept. 28, 1962     2 Sheets-Sheet 2
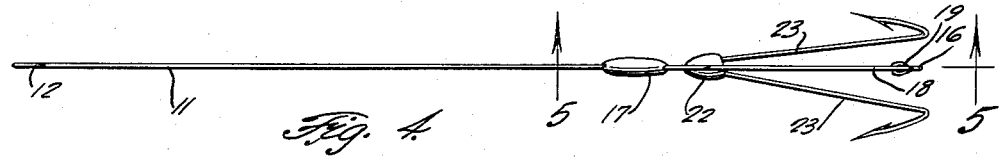
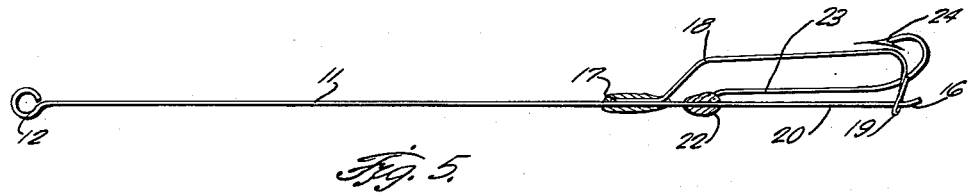
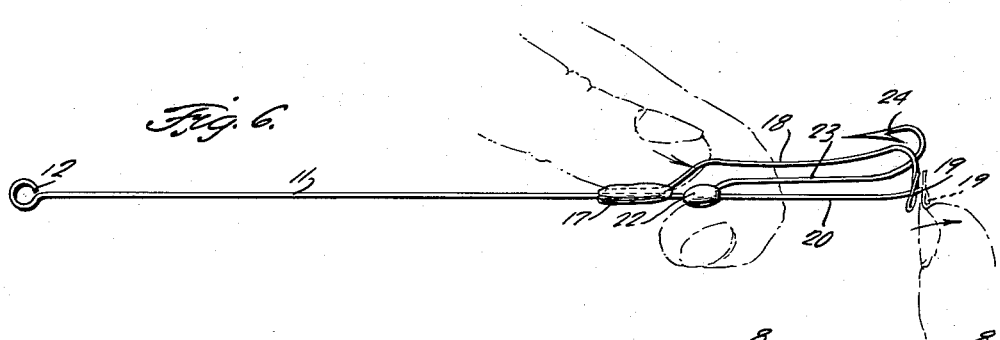
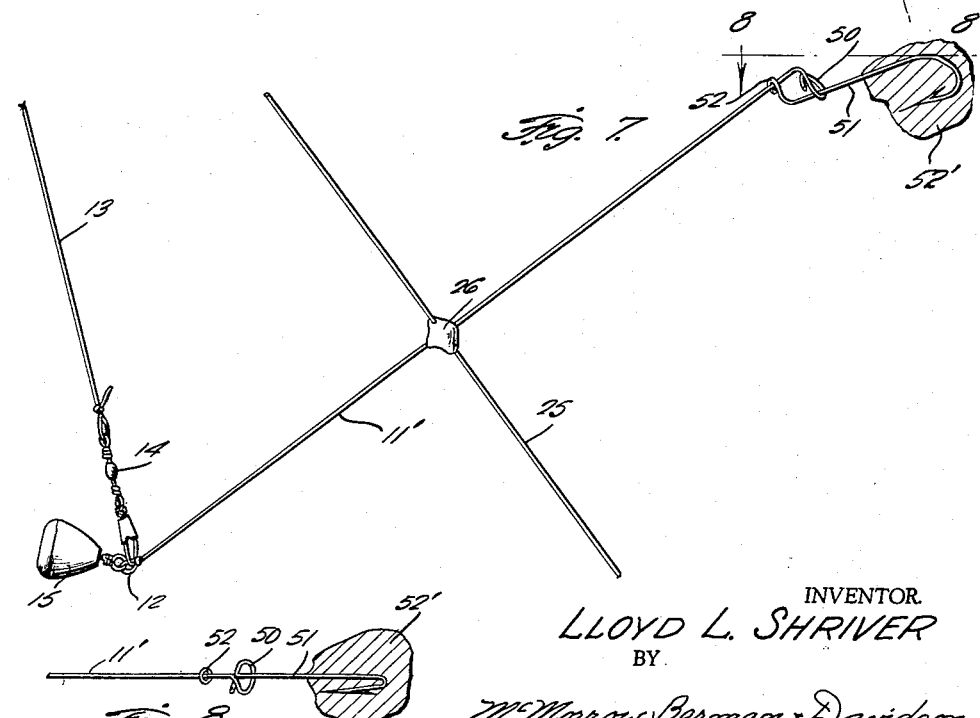
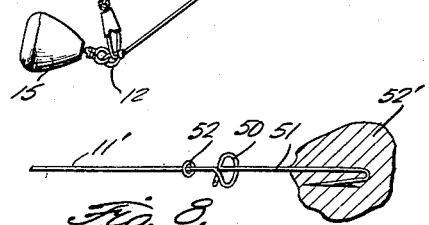
INVENTOR.
LLOYD L. SHRIVER
BY
*McMorrow, Berman & Davidson*
ATTORNEYS

United States Patent Office 3,118,245
Patented Jan. 21, 1964

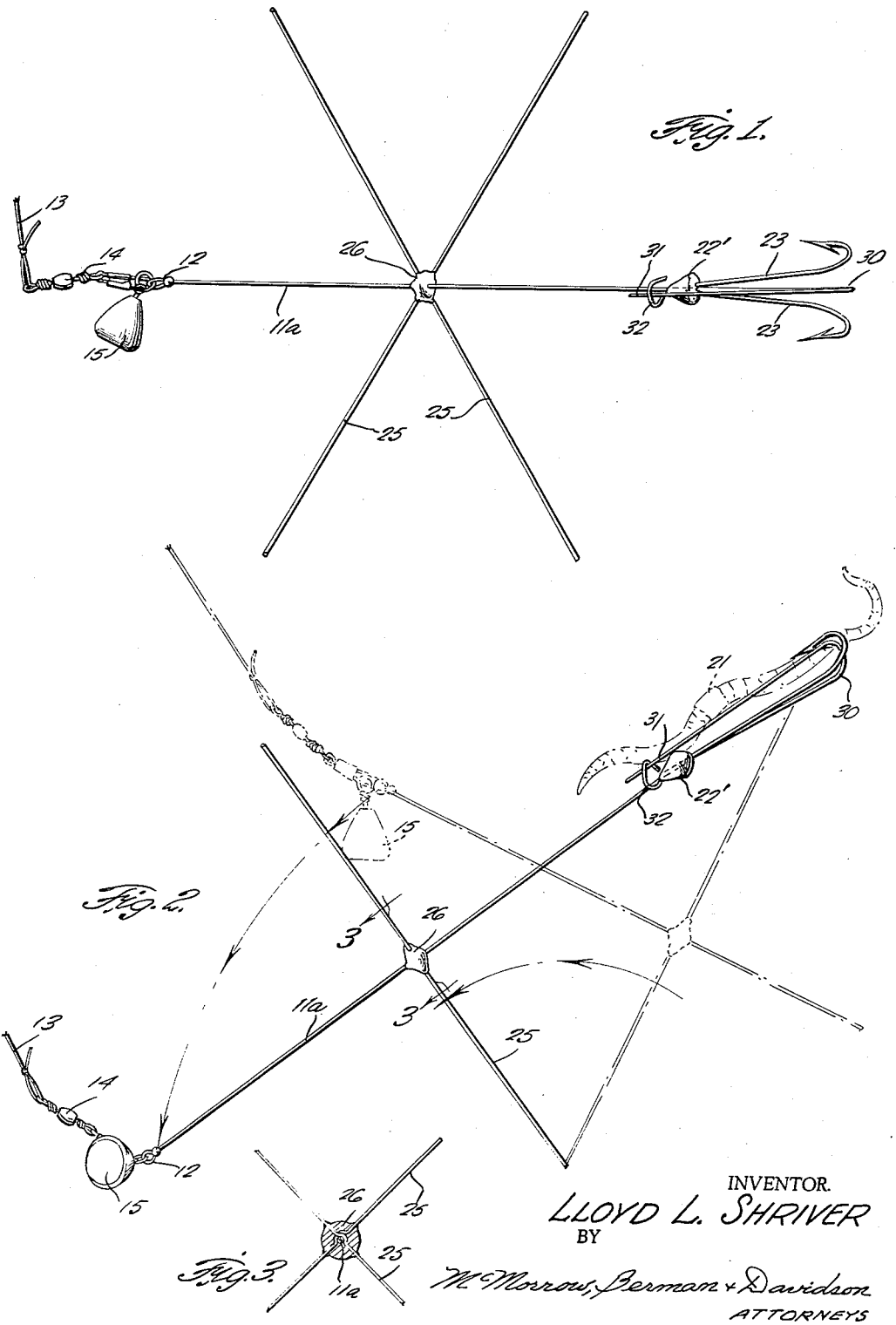

3,118,245
BAIT POSITIONING FISHING DEVICE
Lloyd L. Shriver, 1000 Pike St., Grafton, W. Va.
Filed Sept. 28, 1962, Ser. No. 226,802
1 Claim. (Cl. 43—43.15)

This invention relates to fishing apparatus, and more particularly to a device adapted to carry one or more fishhooks and also to carry live bait in a highly visible position with the associated fishhook or hooks free and clear of any weeds or obstructions, the hook or hooks being located closely adjacent to the live bait.

A main object of the invention is to provide a novel and improved fishing apparatus adapted to rest on the bottom of a body of water and support bait and associated fishhooks in positions upwardly spaced from the bottom and readily accessible to fish, the device being simple in construction, being inexpensive to manufacture, and being adapted for use with throw lines, ordinary fishing poles, and all types of casting equipment.

A further object of the invention is to provide an improved fishing apparatus adapted to be connected to a fishing line and being arranged to support fishing hooks and live bait in elevated positions with respect to the bottom of a body of water so that the bait and fishhooks will be readily accessible to fish, the device being arranged so that when the fishing line is wound up, the device is pulled along the bottom and moves the bait in an erratic manner which is attractive to fish.

A still further object of the invention is to provide an improved fishing apparatus adapted to be connected to a fishing line and carrying one or more fishhooks and also means for supporting live bait adjacent to the fishhooks, the apparatus being usable with various types of bait such as minnows, crayfish, grasshoppers, lizards, fishing worms, and the like, the device being adapted to fall to the bottom of a body of water and to assume any one of several different positions, the bait being inverted in certain of the positions whereby it struggles to move to an upright position, the movements of the bait serving to attract fish to the device.

A still further object of the invention is to provide an improved fishing apparatus adapted to be attached to a fishing line and to support one or more fishing hooks and live bait adjacent to the hooks, the device being usable on mud bars, sand bars, gravel bars, or the like and with various types of bait, the device being durable in construction, supporting the bait in positions which are highly conspicuous to fish, and being usable with a wide range of different types of fishing equipment, such as throw lines, fishing poles, and various types of casting equipment.

Further objects and advantages of the invention will become apparent from the following description and claim, and from the accompanying drawings, wherein:

FIGURE 1 is a top perspective view of an improved fishing device constructed in the present invention, the device being shown in the position in which it would appear when resting on the bottom of a body of water.

FIGURE 2 is a side elevational view of the device in the position of FIGURE 1.

FIGURE 3 is an enlarged fragmentary cross sectional view taken substantially on the line 3—3 of FIGURE 2.

FIGURE 4 is a top plan view of the main shaft member of a modified form of fishing device according to the present invention, shown with the associated hooks and bait supporting means.

FIGURE 5 is a side elevational view of the main shaft member shown in FIGURE 4.

FIGURE 6 is a side elevational view of the main shaft member of FIGURES 4 and 5, illustrating the manner in which the resilient arm associated with the bait-supporting pin element may be flexed to provide access to the pin element for placing bait thereon.

FIGURE 7 is a side elevational view of another modified form of fishing device according to the present invention, shown in a position similar to the position of the device of FIGURE 2, and showing bait material engaged on the hooks of the device, the bait material being shown in longitudinal vertical cross section.

FIGURE 8 is a horizontal cross sectional view taken substantially on the line 8—8 of FIGURE 7.

Referring to the drawings, and more particularly to FIGURES 4 to 6, 11 designates an elongated rod-like main shaft member which is formed at one end with an eye loop 12 adapted to be attached to the end of a fishing line, for example, a fishing line 13 illustrated in FIGURES 1, 2 and 7.

The fishing line 13 may be attached to the loop 12 by means of a conventional swivel connector assembly 14, and a sinker 15 may be attached to the loop 12 in the manner shown in FIGURES 1, 2 and 7.

At the end thereof opposite the loop 12, the main shaft member 11 is bent slightly upwardly, as viewed in FIGURE 5, and as shown at 16. Secured to the main shaft member 11 at 17 is one end of a resilient arm 18, said arm being upwardly offset at its forward portion relative to the shaft 11, as shown in FIGURE 5, and being formed at its end with a depending loop 19 engageable around the free end portion 16 of the main shaft member 11. The depending loop 19 is arranged sufficiently close to the end of portion 16 so that it may be flexed outwardly, in the manner illustrated in dotted view in FIGURE 6, by means of the user's thumb nail, and may be flexed to a position wherein the loop is disengaged from the end portion 16, allowing bait to be placed on the pin element, designated at 20, defined beneath the resilient arm 18. The bait may be secured on the pin element and locked thereon by flexing the loop member 19 so as to engage it over the end portion 16 and thus form a closed loop with the bait, for example the bait 21 shown in FIGURE 2, locked to the pin element 20.

Secured to the main shaft member 11 at 22, namely, at a location adjacent the connection 17 but spaced to the right therefrom, as viewed in FIGURES 4, 5 and 6, are a pair of divergently arranged fishing hooks 23, 23, the fishing hooks being arranged with their barbed portions 24 located on opposite sides of and adjacent to the pin element 20, as is clearly shown in FIGURE 4. The hook elements are therefore located relatively close to the pin element 20, and thus relatively close to bait secured on the pin element, so that when a fish strikes at the bait it cannot avoid contact with the barbed hook portions 24.

The main shaft element and associated structure illustrated in FIGURES 4, 5 and 6 may be employed independently, if so desired, by being merely attached to the end of a fishing line 13 and being used in a conventional manner as a carrier for bait and fishhooks.

Referring now more specifically to FIGURES 1, 2 and 3, a plurality of additional rod-like members 25 may be secured at their mid portions to an intermediate portion of the main shaft member 11a, for example, at 26, being preferably arranged in a plane substantially perpendicular to said main shaft member 11a. The rod-like members 25, 25 are arranged so that their arms diverge relative to each other on the opposite sides of the main rod-like shaft member 11a and define supporting legs for supporting the main shaft member 11a in an inclined position on the bottom of a body of water, for example, in a position such as that illustrated in FIGURE 2.

With two rod-like members 25, there are thus defined four arms projecting outwardly from the main shaft member, comprising two pairs of diverging arms on each side of the main shaft member. Obviously any desired number of arms may be employed, the only requirement being that the outwardly projecting arms diverge so as to define a support for the main shaft member 11a to hold said main shaft member in an inclined position on the bottom of a body of water.

The connections of the arms 25 to the main shaft member may be made by the use of a mass of solder or the like at the connection 26. The various other connections, namely, connections 17 and 22 may be similarly formed.

In the specific form of the invention shown in FIGURES 1 and 2, the end of the main shaft member 11a opposite the loop 12 is reversely bent to define a resilient loop 30 having a flexible top arm 31 which is lockingly engageable with a retaining hook or open loop 32 secured to the main shaft member 11a at the soldered connection 22'. The fishhooks 23, 23 are secured to the main shaft member 11a at said soldered connection 22' and are arranged substantially in the same manner as in FIGURES 4, 5 and 6, being located on opposite sides of and relatively closely spaced with respect to the bait-retaining loop 30. Thus, as shown in FIGURE 2, the bait 21 may be engaged on the pin element defined by the flexible arm 31, and the arm may be locked within the retaining hook 32 so as to define a closed loop in which the bait 21 is impaled. Thus, the bait-retaining means of FIGURES 1 and 2 differs from the bait-retaining means on the main shaft member 11 in FIGURES 4, 5 and 6 in that the pin element 31 in FIGURES 1 and 2 is integral with the main shaft element and is lockingly engaged with a hook 32 secured to the main shaft element, whereas in FIGURES 4, 5 and 6, the pin element 20 is lockingly engageable by the loop 19 carried on the end of the resilient locking arm 18, the locking arm being secured to the shaft by the soldering connection 17.

It will be readily apparent that the shaft member 11 of FIGURES 4, 5 and 6 may be provided with the perpendicularly extending additional rod members 25 rigidly secured to the intermediate portion of the main shaft member and extending in a plane perpendicularly thereto, as in FIGURES 1 and 2.

In the form of the invention shown in FIGURES 7 and 8, the main shaft member is designated at 11' and is formed at the end thereof opposite the attaching loop 12 with a laterally projecting loop 50. A fishing hook 51 is formed with an attaching loop 52 which is slidably engaged on the shaft member 11' inwardly of the loop 50, the shank of the fishing hook passing slidably through the loop 50 so that the hook is movable in a longitudinal direction relative to the shaft member 11' and may also rotate slightly relative to the main shaft member, since the loop 50 is relatively wide. A mass of bait material 52' may be impaled on the hook 51 in the manner clearly shown in FIGURES 7 and 8. If live bait is employed, the movements of the bait will serve to attract fish toward the device, as in the case of the previously described forms of the invention.

In using the various forms of the device illustrated in the drawings and described above, the device is placed in the water in the usual manner, for example, being employed with a throw line, an ordinary fishing pole, or any usual type of casting equipment. The device rests on the bottom of the body of water supporting the main shaft element thereof in an inclined position, for example, as shown in FIGURES 2 and 7, with the bait elevated and relatively conspicuous. When the device is first dropped down to the bottom, it assumes the position thereof shown in dotted view in FIGURE 2, after which the sinker 15 causes the device to rotate to the full line position thereof in FIGURE 2, namely, a position wherein the main shaft element is inclined upwardly and away from the sinker 15.

When used with casting equipment, after each cast the fisherman winds the line up and pulls the device back, stopping at various positions. As the device is pulled along the bottom of the body of water, it moves erratically and eccentrically, which serves to attract fish thereto.

It will be noted that when the device drops to the bottom of the body of water, it can be in any one of several different positions, for example, in four different positions when a device such as that illustrated in FIGURES 1, 2 and 7 is employed. In many of these positions the live bait is inverted and struggles to assume an upright position. The movements of the live bait thus further serve to attract fish to the device.

While certain specific embodiments of an improved fishing device have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A fishing device adapted to rest on the bottom of a body of water and support a bait and associated hook means in position spaced from the bottom, the device comprising:

(a) an elongated, rod-like main shaft member having a pair of opposite ends;

(b) fish hook attachment means at one of the ends;

(c) the last named end including bait attachment means comprising a resilient, reverted loop at said end of said main shaft member, the loop including a top arm, a retaining loop fixed to the main shaft end, fish hooks secured to said end, the top arm being engaged with the retaining hook to define a closed loop adapted for retaining a bait adjacent the fish hooks;

(d) means at the other end of the shaft member for attaching same to a fishing line;

(e) weight means secured to the last named end of the main shaft member;

(f) a plurality of additional rod-like members rigidly secured to an intermediate portion of the main shaft member divergently with respect to each other, in a plane substantially perpendicular to the main shaft member; and (g) the rod-like members being adapted to support the main shaft member whereby the main shaft member is caused to rotate on the rod-like members to an inclined position when the device engages the bottom of a body of water, whereby the fish hook is elevated and held in a position a substantial distance above the bottom.

References Cited in the file of this patent

UNITED STATES PATENTS

| | | |
|---|---|---|
| 254,313 | Hemming | Feb. 28, 1882 |
| 690,109 | Hubbard | Dec. 31, 1901 |
| 778,875 | Mathews | Jan. 3, 1905 |
| 1,215,938 | Jay | Feb. 13, 1917 |
| 1,457,373 | Kessel | June 5, 1923 |
| 1,791,723 | Hampton | Feb. 10, 1931 |
| 2,755,593 | Thurman | July 24, 1956 |
| 2,791,060 | Kender | May 7, 1957 |
| 2,917,860 | Norton | Dec. 22, 1959 |